Nov. 17, 1931.                J. P. TARBOX                1,832,334
                         BALANCING SYSTEM FOR AIRCRAFT
                      Filed Feb. 21, 1931      2 Sheets-Sheet 2
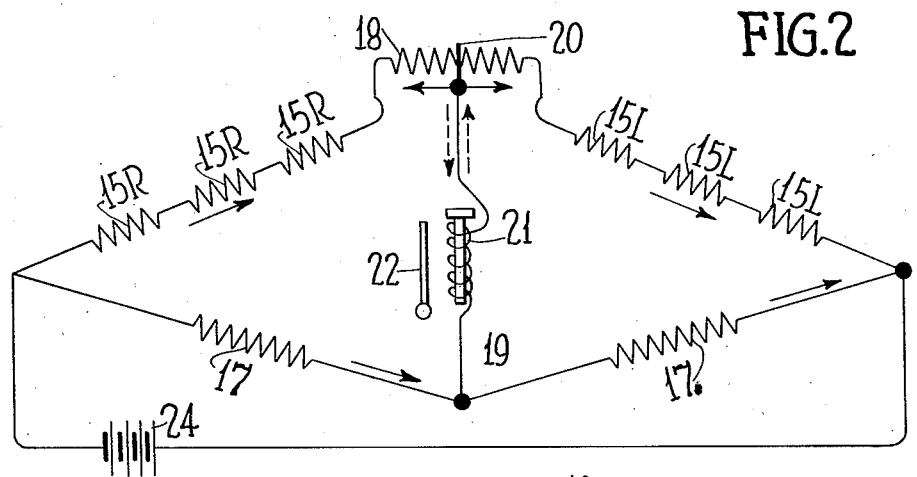
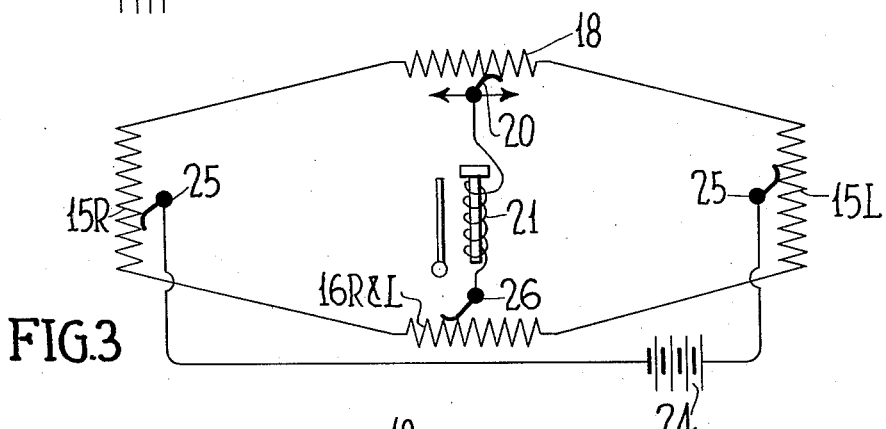
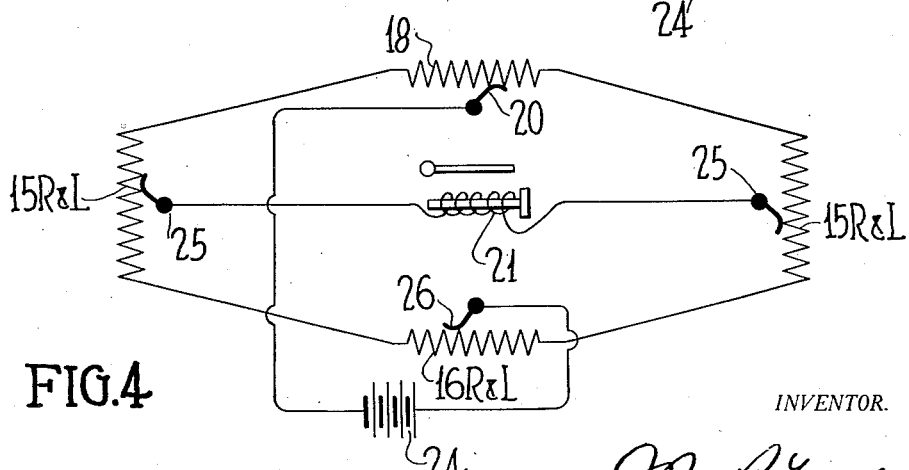
INVENTOR.

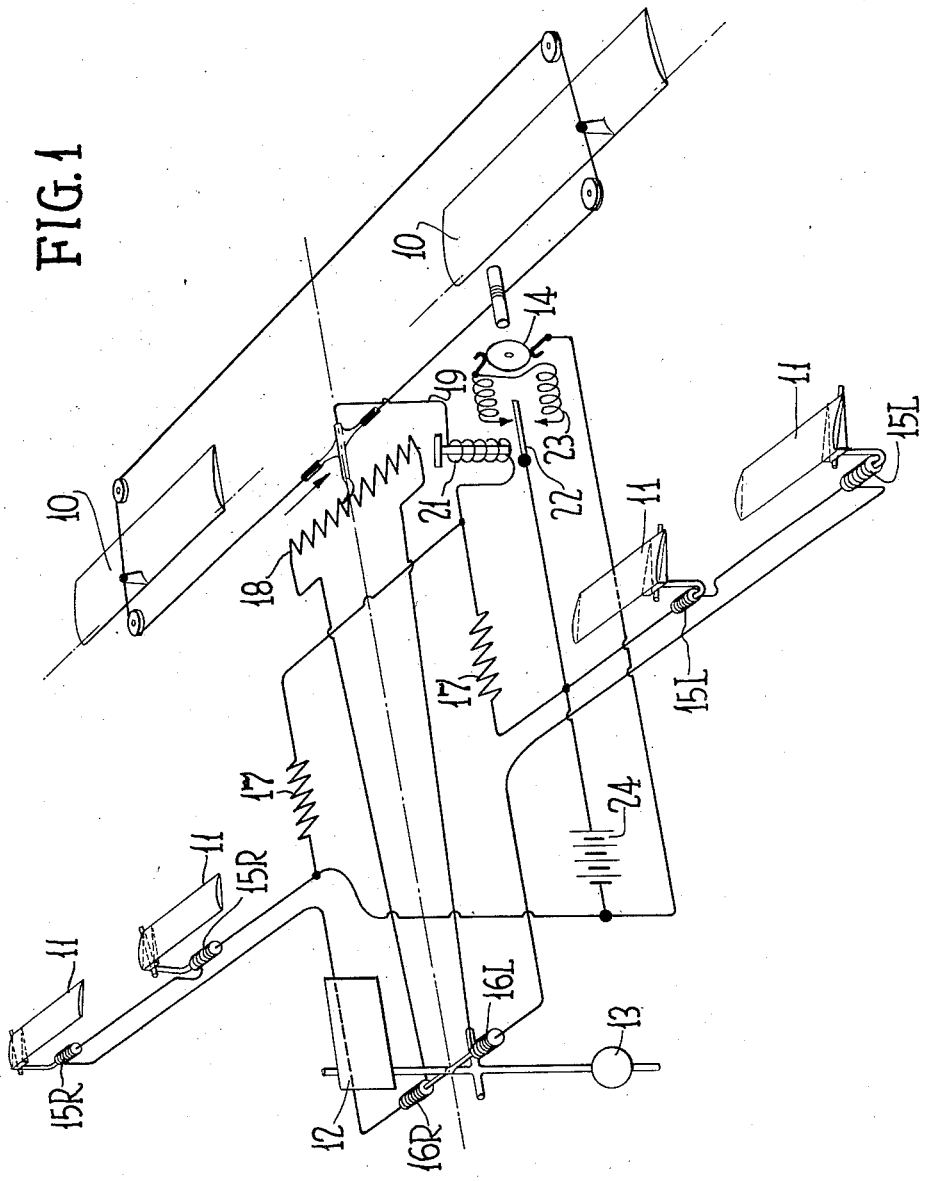

Patented Nov. 17, 1931

1,832,334

UNITED STATES PATENT OFFICE

JOHN P. TARBOX, OF PHILADELPHIA, PENNSYLVANIA

BALANCING SYSTEM FOR AIRCRAFT

Application filed February 21, 1931. Serial No. 517,394.

This invention is an improvement on the invention of my application Serial No. 335,777, Balancing system for aircraft, filed January 29, 1929. Its object is to simplify such systems and eliminate so far as practical mechanical apparatus in favor of electrical apparatus. The electrical apparatus is easier to install, is more compact, and the connections to the various pilot devices may be installed interiorly of the wing and body structures, thereby eliminating wind resistances, etc. Yet a further object is to render simpler the electrical connections and inter-actions themselves.

All of these things I accomplish by a peculiar combination of pilot controlled variable resistances in corresponding arms of a Wheatstone bridge. Preferably I place all of the pilot controlled variable resistances in one pair of corresponding arms. In the other I place standardized resistances. Between the two corresponding arms containing the pilot controlled variable resistances I place a resistance which may be variably distributed between the two arms of the pilot resistances. This variable distribution I effect by variably inter-connecting the interconnection between the arms to this resistance incident to the movements of the follow-up device connected with the rudders which are governed by the pilots. In this inter-connection between the arms I place a polarized relay in lieu of an indicating instrument as is usual in Wheatstone bridges.

In the accompanying drawings—

Figure 1 is a perspective diagram of the general arrangement of the pilot devices, rudder and servo motor on the aeroplane.

Figure 2 is a diagram of the electrical connections including electrical connections principally of the bridge.

Figure 3 is a diagram of one modification.

Figure 4 is a diagram of still another.

The principal elements disclosed in Fig. 1 are of the same order and type as disclosed in my co-pending application Serial No. 335,777, filed January 29, 1929. But they may be of other orders and types. The rudders, in this case, ailerons or lateral balancing rudders, are designated 10. The pilot ailerons are designated 11. The combined vertical vane and pendulum is designated 12—13. The servo motor is designated 14. But it will be noted that there are provided a multiple number of pilot ailerons 11 on each side of the plane of symmetry, distributed along the wing spread. The pilot ailerons to the right and left of the plane of symmetry, respectively, variably operate resistances 15R and 15L. The combined vane and pendulum or standard of position with respect to earth variably operates resistances 16R and 16L. By variable operation is meant that the resistances are raised or lowered in accordance with the varying controlling forces developed in the pilot devices. It is immaterial whether the resistances are raised or lowered by these forces. It suffices that the variation be proportional to the force, and that variations in pilot force, which should produce one and the same rudder movement, shall be electrically coordinated in the proper manner. In the illustration in Fig. 1, I have shown resistances of the pressure varied type rather than resistances of the contact varied type and in the arrangement shown, these resistances are lowered by increase of pressure as developed by the pilot devices. The arrangement might be reversed and such resistances might be arranged to be increased by decrease of pilot pressure and resistances of the contact or inductor varied type might be used instead or as well as any other.

These pilot controlled-variable resistances 15R and L and 16R and L are shown connected, those of the R series or right hand series, in one arm of the bridge, and those of the L or left hand series in the corresponding opposite arm of the bridge in Fig. 2. In the remaining arms are connected unvarying standardized resistances 17. Between the arms containing the pilot control resistances is inserted a resistance 18. The cross connection of the bridge 19 is variably connected with this resistance through a sliding contact 20 or its equivalent in such manner that resistance 18 may be variably distributed between the corresponding arms containing it. The sliding contact 20 is connected to be moved by the cable lead of servo motor 14 as indicated in Fig. 1 for the purpose of effecting this variable distribution. Cross connection 19 contains the polarized relay 21 whose contacts 22 controls the direction of rotation of the electro-servo motor 14 through reversing fields 23. The operation is as follows: Normally the bridge is balanced, and no current flows through the cross connection 19 or the polarized relay 21. In this position the rudders 10 are in neutral and the servo motor is de-energized. But current is flowing through the bridge from the battery 24 and through corresponding arms thereof but none through the cross connection 19 or the polarized relay 21 as indicated by the full line arrows. This is because the pilot devices themselves are in balanced relation to each other. The moment any active controlling force is developed on the part of any pilot, however, the variable resistance associated therewith of the series R or L, as the case may be, is changed. There follows current flow in one direction or the other as indicated by the opposed dotted line arrows in the cross connection 19 and through the polarized relay 21. Thus, the control contact 22 is thrown in the proper direction (the controlling effects having been previously coordinated) to energize the servo motor 14 for rotation in that direction which will counteractively operate the rudders 10.

As this operation proceeds, the element 20 operates resistance 18 to variably distribute this resistance between the corresponding arms which it connects, to vary resistance of the arms in such manner as to again equalize or balance the resistances of these arms and therefore again balance the bridge. The moment this re-distribution of resistance 18 reaches the point of bridge balance current flow ceases in cross connection 19 and the polarized relay is de-energized, stopping the servo motor and bringing the rudders 10 to rest. Clearly, the equalizing movement of the element 20 necessary to bring about such a balance is proportional precisely to the variation in resistance which was initially brought about by the variation in pilot controlling force. The rudders 10 are therefore moved a degree proportional to the degree of disturbance which has created the active pilot force.

This setting of the rudders continues so long as the disturbing force continues in the same degree. It changes with any change in that controlling force. It is supplemented by change in active controlling force of any one of the pilot devices of any location whatsoever. Thus, for example, an original operation of rudders 10 effected through wind gust on an out-board pilot aileron 11 will be supplemented should unbalancing of the craft ensue and bring about change in active controlling force of the vane-pendulum combination 12—13 effecting variable resistances 16R and 16L, the one of which would be decreased and the other increased simultaneously inasmuch as those resistances of the pressure operated type are shown. This would bring about current flow in connection 19 in the same direction as that originally brought about by the pilot device 11, and a supplementary movement of rudders 10 in the same direction. Re-distribution of resistance 18 takes place in the same direction as originally and to a further extent. Thereby initial rudder deflection incident to initial wind gust is supplemented by further deflection in case actual unbalancing of the aircraft ensues due to prolongation of the gust or other causes.

The wind gust having passed the active controlling force of the disturbed pilot aileron 11 is removed and resistance 15R is restored to its original value. Immediately the bridge is unbalanced in the opposite direction, current flow in connection 19 takes place oppositely to the original flow and polarized relay 21 reverses itself, reversing the servo motor. The rudders 10 are thereupon retracted until the element 20 has been moved to restore the original distribution of resistance 18 to such degree as will effect balance of the bridge once more. But if the craft itself is not yet in complete balance, there will still be an active controlling force through the standard of position with respect to earth 13 and the restoration of the original distribution of resistance 18 will not be complete. As the unbalanced condition of the aircraft approaches complete relief, however, the active controlling force of device 13 will be removed, and resistances 16R and 16L restored to their normal value, whereupon further reverse operation of polarized relay 21 servo motor 14, and rudders 10 takes place in sufficient degree to bring not only the bridge itself but all elements of the system back into a normal balance.

The operation during turning of the craft as effected through the pilot devices is according to the same sequence of action and need not be described here since the functions of the pilot devices under these conditions have been fully described in my co-pending applications and issued patents.

All of the objects of my invention are attained by this system. An outstanding advantage of it is the fact that through the use of the variable resistances or their equivalent, I am able to distribute the pilot devices about the aircraft in any and all locations which may be desirable, and through electrical circuits which inter-connect them to coordinate and integrate the active controlling forces in such manner as to operate the rudders of the craft in perfect coordination with the variations of the active controlling forces. Not only the accuracy and completeness of the response to the disturbing conditions are highly improved, but also the rapidity and certainty. Initial anticipation of unbalancing or change of course by presetting of the rudders to oppose such change of attitude as a craft is greatly speeded up. Moreover, hyper-sensitivity is easily avoided by properly choosing the characteristics of the polarized relay. For example, if it is not desired to have the system operate upon minor disturbances, which may be readily met by the inherent characteristics of the aircraft, such for example, as the dihedral, polarized relay 21 may be wound or adjusted for initial actuation upon pre-determined current flow of a value corresponding with the minimum permissible non-effective active controlling force of such disturbance. Moreover, the adjustment of the armature of such relay, however, may be readily made such that the forces of residual magnetism or other controlling factors in the design of the relay will permit it to let go only when current flow in cross connection 19 is absolutely zero or nearly so, thereby effecting a truly proportional movement of the rudders when movement does take place.

The use of the polarized relay is rendered possible through its connection by way of the resistance 18 and resistance varying element 20. This latter device constitutes an electrical follow-up device, and thus there is eliminated not only the need for a measuring instrument as common in devices of the bridge type but also any need for mechanical follow-up devices. Simplicity, compactness, lightness and cheapness of the devices are therefore also attained.

The modifications as disclosed are modifications of the bridge circuits and resistance arrangements rather than modifications of the pilot devices. Accordingly, the pilot devices are not shown. In each of these figures the corresponding elements are correspondingly lettered.

The modification of Fig. 3 consists in the elimination of the standardized resistances and the distribution of each resistance 15R or 15L as the case may be between opposite arms of the bridge, and the distribution of the resistances 15 R and L between corresponding arms on the same side of the bridge. In this manner each pilot, as its active controlling force changes, increases resistance in one arm and simultaneously decreases the resistance in the other arm. Sliding contact connections 25 are shown intended to be operated by the pilots 11 and to play over the resistance 15R and 15L. Similarly sliding contact element 26 is arranged to play over the combined resistances 16R and 16L under the active controlling force of the pilot 12—13. The battery 24 is connected from one sliding contact 25 to the other. The polarized relay 21 is connected between sliding contact 26 and the sliding contact 20 of the follow-up resistance 18 which is arranged as heretofore. Quite obviously other resistances 15R and 15L may be interpolated in corresponding arms on the same side of the bridge as heretofore and so also other resistances 16R and 16L may be similarly interpolated as in the instance of Fig 2. Obviously also, the sliding contacts may be replaced by the central pressure elements of resistance piles subject to change under pressure from the pilot devices as indicated in Fig. 1 except that the pressure element operates between the two resistance pilots instead of on one only. The balance of the bridge occurs when resistance 18 has been so distributed by the follow-up device as to bring the current in the cross connection 19 and the polarized relay 21 to zero.

In Figure 4 the arrangement is the same excepting that the bridge has been turned through 90° by making the cross connection 19 including the polarized relay 21 between the contact elements 25 and the battery connection between elements 20 and 26.

There is an instrument on the market at the present time known as the telemeter, composed of carbon piles of resistance variable under pressure, which instruments or others made in the same way can be utilized at each juncture where the variable resistances are required. This instrument has the advantage of freedom from erratic operation under any vibrations except those relatively high, and while ordinarily constructed for relatively small resistance variation may readily be constructed to give very relatively large resistance variation in response to relatively small active controlling forces of certain pilot devices.

My invention is defined in the accompanying claims in those terms which appear at the present time to be the most compatibly joined to satisfy the ends of clarity and breadth. Obviously, both of these considerations may be more fully understood as time progresses and they should therefore be interpreted only in the light of the full spirit of the invention in whatsoever lines it may develop.

What I claim as new and useful is:

1. A balancing system for aircraft comprising a Wheatstone bridge, a multiple number of varying resistances in the same arm of said bridge, and separate pilot controlling devices controlling each resistance in said arm.

2. An electrical balancing system for aircraft comprising a Wheatstone bridge, a variable resistance between corresponding variable arms of said bridge, and a follow-up device rendered effective through variation of said resistance.

3. An electrical balancing system for aircraft comprising a Wheatstone bridge having unvarying resistances in two corresponding arms, varying resistances in the two remaining corresponding arms, and balance control pilot devices controlling said varying resistances.

4. An electrical balancing system for aircraft, comprising a Wheatstone bridge the differential arm of which contains a polarized relay, variable resistances in two corresponding arms and a variable resistance intervened between said arms together with a follow-up device varying the connection of said polarized relay with said intervened resistance.

5. An electrical balancing system for aircraft comprising a Wheatstone bridge, unvarying resistances in two corresponding arms thereof, variable resistances in the two remaining corresponding arms thereof, pilot devices controlling said variable resistances, a polarized relay in the differential arm of said bridge, and a variable resistance intervened between said corresponding variable resistance arms together with a follow-up device variably connecting the polarized relay with said resistance.

6. An electrical balancing system for aircraft comprising a Wheatstone bridge having a multiple number of variable resistances in each of two corresponding arms thereof, lateral balance pilot devices controlling said resistances in the respective arms and a standard of position with respect to earth controlling corresponding resistances in the respective arms.

7. An electrical balancing system for aircraft comprising a Wheatstone bridge, laterally disposed pressure responsive devices differentially controlling resistances in all arms of the bridge, a standard of position with respect to earth differentially controlling resistances in one pair of corresponding arms, a follow-up device differentially controlling resistances in the other pair of corresponding arms, and a circuit closing bridge indicator connected between the differential points of said two last-named resistances together with a source of power connected between the differential points of said first-named resistances.

8. An electrical balancing system for aircraft comprising a Wheatstone bridge, laterally disposed pressure responsive devices differentially controlling resistances in all arms of the bridge, a standard of position with respect to earth differentially controlling resistances in one pair of corresponding arms, a follow-up device differentially controlling resistances in the other pair of corresponding arms, a circuit closing bridge indicator connected between the differential points between said first-named resistances, and a source of power connected between the differential points of said last-named resistances.

In testimony whereof he hereunto affixes his signature.

JOHN P. TARBOX.